United States Patent
Manabe et al.

(10) Patent No.: US 10,547,495 B2
(45) Date of Patent: Jan. 28, 2020

(54) INFORMATION PROCESSING APPARATUS, RECORDING MEDIUM, AND INFORMATION PROCESSING METHOD

(71) Applicant: KYOCERA DOCUMENT SOLUTIONS INC., Osaka (JP)

(72) Inventors: Hiroshi Manabe, Concord, CA (US); Paul Michael Ong Siy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 214 days.

(21) Appl. No.: 15/853,606

(22) Filed: Dec. 22, 2017

(65) Prior Publication Data

US 2019/0199575 A1  Jun. 27, 2019

(51) Int. Cl.
*H04L 29/06* (2006.01)
*H04L 12/24* (2006.01)
*G06F 8/38* (2018.01)
*G06F 3/12* (2006.01)

(52) U.S. Cl.
CPC ........ *H04L 41/0213* (2013.01); *G06F 3/1254* (2013.01); *G06F 8/38* (2013.01); *H04L 41/0803* (2013.01)

(58) Field of Classification Search
CPC ... H04L 41/0213; H04L 41/0803; G06F 8/38; G06F 3/1254
USPC ........................................................ 709/223
See application file for complete search history.

(56) References Cited

U.S. PATENT DOCUMENTS

| | | | | |
|---|---|---|---|---|
| 10,142,495 B2* | 11/2018 | Shih | .................... | H04L 43/0811 |
| 10,248,366 B2* | 4/2019 | Matsuura | .............. | G06F 3/1204 |
| 2007/0168572 A1* | 7/2007 | Miyazawa | .......... | H04L 41/0253 710/8 |
| 2008/0130026 A1* | 6/2008 | Mizuno | ................. | G06F 21/608 358/1.9 |
| 2009/0113035 A1* | 4/2009 | Ohashi | .................... | H04L 63/20 709/223 |

(Continued)

FOREIGN PATENT DOCUMENTS

JP    2016-035658 A    3/2016

*Primary Examiner* — Moustafa M Meky
*Assistant Examiner* — Elizabeth Kassa
(74) *Attorney, Agent, or Firm* — Li & Cai Intellectual Property (USA) Office

(57) ABSTRACT

An information processing method includes: activating the SNMP module, and controlling an SNMP module to obtain device configuration information of an image forming apparatus from the image forming apparatus by using SNMP-based-communication information stored in Queue Property Bag by means of SNMP-based communication via a communication interface, the SNMP-based-communication information being authentication information necessary for the SNMP-based communication, and to store the obtained device configuration information in the Queue Property Bag; and determining a function that the image forming apparatus is configured to execute on the basis of the device configuration information obtained and stored in the Queue Property Bag by the SNMP module, and generating a first customized UI supporting the determined function, the first customized UI being a customized UI of the V4 printer driver.

14 Claims, 5 Drawing Sheets

(56) References Cited

U.S. PATENT DOCUMENTS

| | | | |
|---|---|---|---|
| 2015/0106918 A1* | 4/2015 | Yamada | G06F 21/45 |
| | | | 726/18 |
| 2018/0074760 A1* | 3/2018 | Matsuura | G06F 3/1204 |
| 2018/0074764 A1* | 3/2018 | Yamashita | G06F 3/1268 |
| 2018/0077036 A1* | 3/2018 | Zhao | H04L 43/065 |
| 2018/0267750 A1* | 9/2018 | Kobayashi | G06F 3/1225 |

* cited by examiner

INFORMATION PROCESSING APPARATUS, RECORDING MEDIUM, AND INFORMATION PROCESSING METHOD

BACKGROUND OF THE INVENTION

1. Field of the Invention the present disclosure relates to an information processing apparatus configured to execute a V4 printer driver including a printer extension module, a non-transitory computer readable recording medium that stores the printer extension module, and an information processing method.

2. Description of Related Art

Windows 8 (registered trademark), which is an OS (Operating System) developed by Microsoft (registered trademark), employs so-called V4 (Version 4) printer driver architecture. UIs (User Interfaces) of the V4 printer driver support vendor-specific print configuration windows, the vendor being a supplier of image forming apparatuses.

SUMMARY OF THE INVENTION

According to an embodiment of the present disclosure, there is provided an information processing apparatus, including:

a communication interface configured to execute SNMP-based communication with an image forming apparatus via a network;

a memory that stores

Queue Property Bag that stores SNMP-based-communication information, the SNMP-based-communication information being authentication information necessary for the SNMP-based communication, an SNMP module configured to execute the SNMP-based communication, and a V4 printer driver including a printer extension module; and a processor configured to execute the printer extension module and the SNMP module, in which when the processor executes the printer extension module, the processor operates as an SNMP manager configured to activate the SNMP module, and control the SNMP module to obtain device configuration information of the image forming apparatus from the image forming apparatus by using the SNMP-based-communication information stored in the Queue Property Bag by means of the SNMP-based communication via the communication interface, and to store the obtained device configuration information in the Queue Property Bag, and a first device configuration manager configured to determine a function that the image forming apparatus is configured to execute on the basis of the device configuration information obtained and stored in the Queue Property Bag by the SNMP module, and generate a first customized UI supporting the determined function, the first customized UI being a customized UI of the V4 printer driver.

According to an embodiment of the present disclosure, there is provided a non-transitory computer readable recording medium, that stores a printer extension module of a V4 printer driver, the printer extension module causing a processor of an information processing apparatus to operate as:

an SNMP manager configured to activate the SNMP module, and control an SNMP module to obtain device configuration information of an image forming apparatus from the image forming apparatus by using SNMP-based-communication information stored in Queue Property Bag by means of SNMP-based communication via a communication interface, the SNMP-based-communication information being authentication information necessary for the SNMP-based communication, and to store the obtained device configuration information in the Queue Property Bag; and a first device configuration manager configured to determine a function that the image forming apparatus is configured to execute on the basis of the device configuration information obtained and stored in the Queue Property Bag by the SNMP module, and generate a first customized UI supporting the determined function, the first customized UI being a customized UI of the V4 printer driver.

According to an embodiment of the present disclosure, there is provided an information processing method, including:

activating the SNMP module, and controlling an SNMP module to obtain device configuration information of an image forming apparatus from the image forming apparatus by using SNMP-based-communication information stored in Queue Property Bag by means of SNMP-based communication via a communication interface, the SNMP-based-communication information being authentication information necessary for the SNMP-based communication, and to store the obtained device configuration information in the Queue Property Bag; and determining a function that the image forming apparatus is configured to execute on the basis of the device configuration information obtained and stored in the Queue Property Bag by the SNMP module, and generating a first customized UI supporting the determined function, the first customized UI being a customized UI of the V4 printer driver.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Hardware Configuration of Information Processing Apparatus

Figure 1:
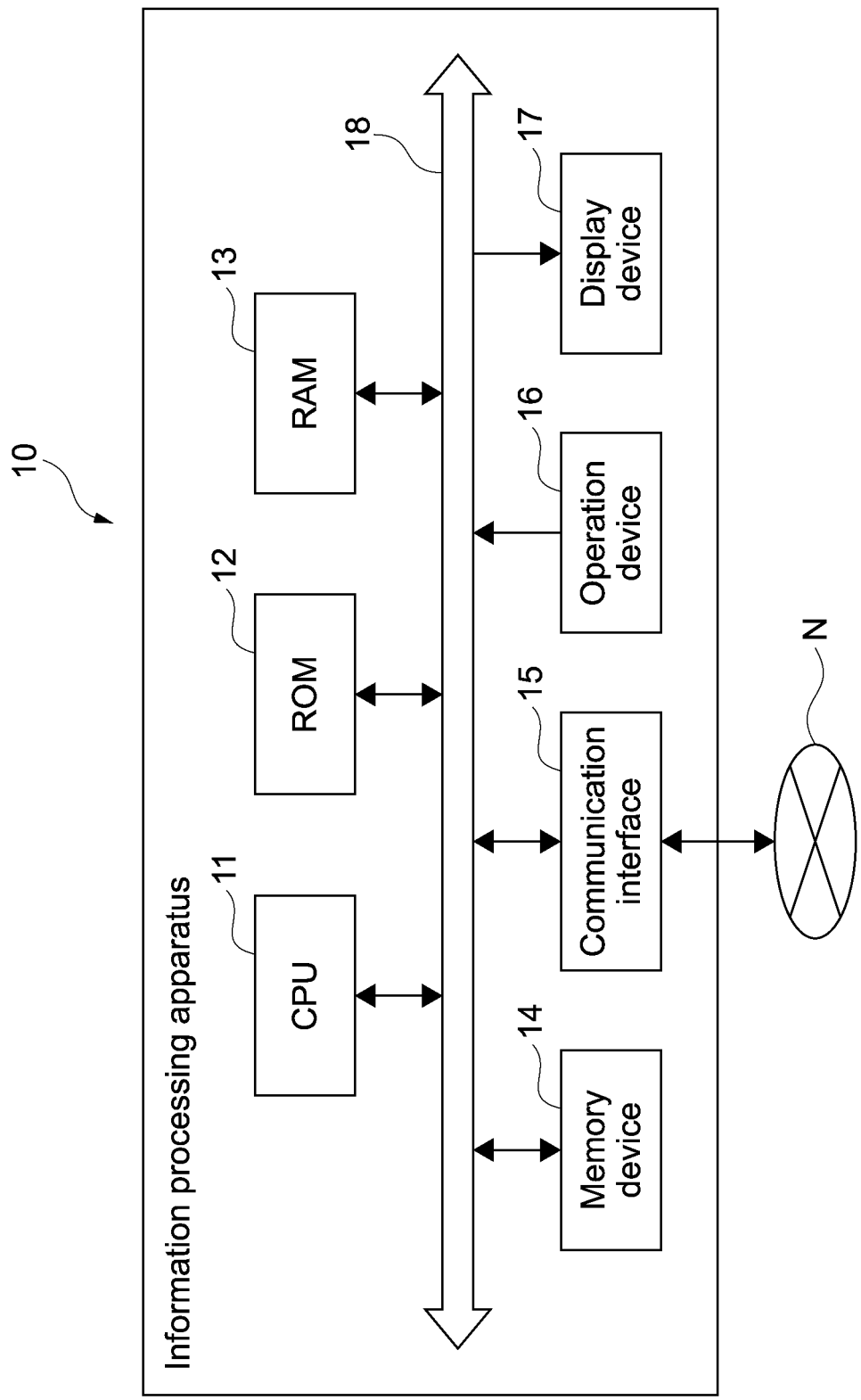
FIG. 1 shows a hardware configuration of an information processing apparatus according to an embodiment of the present disclosure.

FIG. 1 shows a hardware configuration of an information processing apparatus according to an embodiment of the present disclosure.

The information processing apparatus 10 is typically a personal computer or a tablet device. The information processing apparatus 10 includes the CPU (Central Processing Unit) 11 (processor), the ROM (Read Only Memory) 12 (memory), the RAM (Random Access Memory) 13, the memory devices 14, the communication interface 15, the operation devices 16, and the display device 17. The information processing apparatus 10 further includes the bus 18 connecting them.

The CPU 11 (processor) loads information processing programs (described later), which are stored in the ROM 12 (memory), in the RAM 13 and executes the information processing programs. The ROM 12 is a nonvolatile memory, and stores the programs that the CPU 11 executes, data, and the like. The ROM 12 is an example of a non-transitory computer readable recording medium.

The memory devices 14 include a large-volume recording medium such as an HDD (Hard Disk Drive) and an SSD (Solid State Drive) and an external recording medium such as a USB (Universal Serial Bus) memory.

The communication interface 15 is an interface configured to connect to the network N. The communication interface 15 is configured to communicate with the image forming apparatus (Multifunction Peripheral, hereinafter simply referred to as MFP) 20 via the network N such as the Internet and a LAN (Local Area Network).

The operation devices 16 include a keyboard, a mouse, a touchpad, and various switches. The operation devices 16 detect operations input by a user and output signals based on the detected operations to the CPU 11.

The display device 17 includes an LCD, an organic EL display, or the like. The display device 17 executes calculation processing on the basis of information received from the CPU 11, and displays images on the display on the basis of generated image signals.

2. Functional Configuration of Information Processing Apparatus

Figure 2:
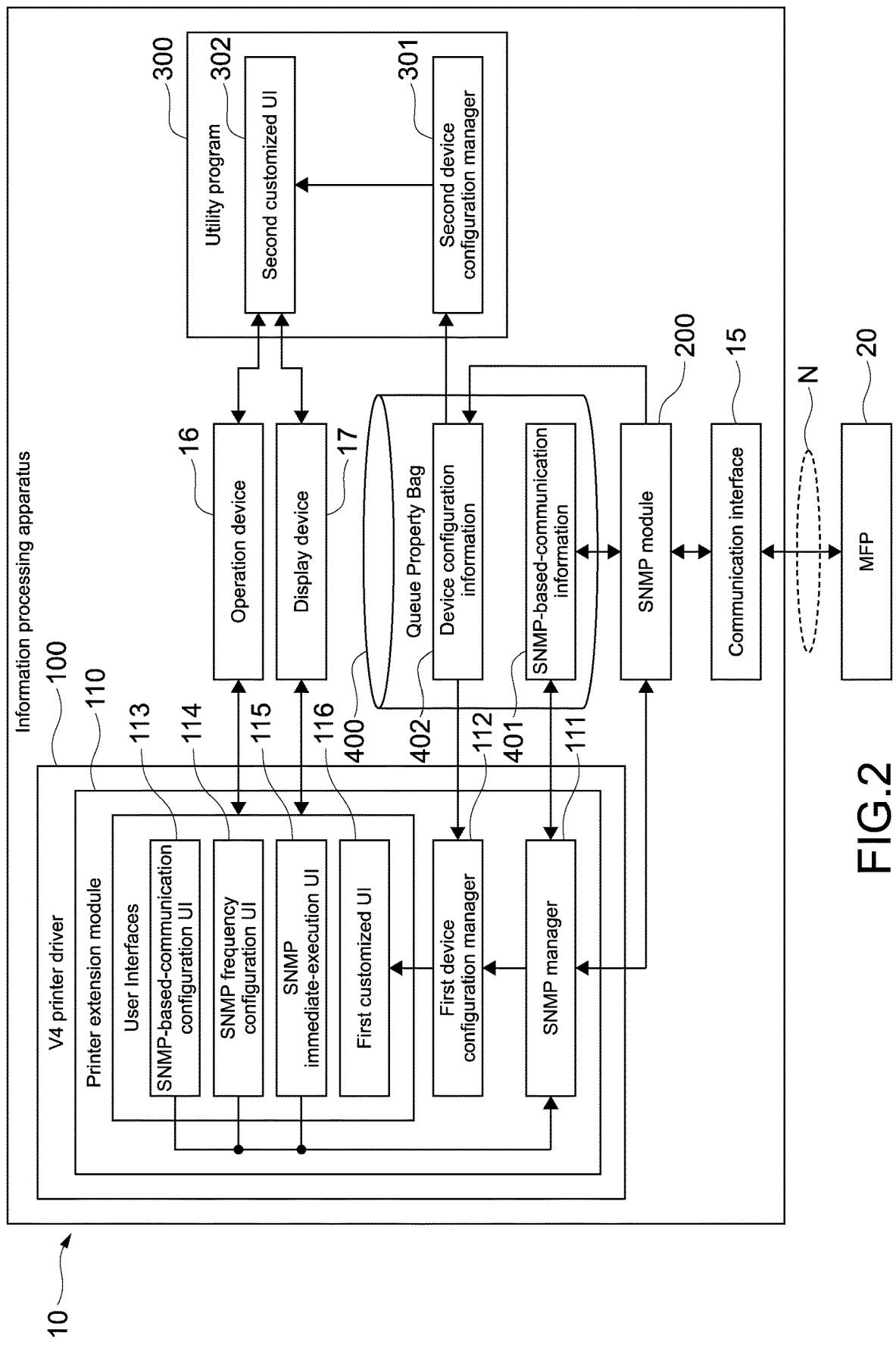
FIG. 2 shows a functional configuration of the information processing apparatus.

FIG. 2 shows a functional configuration of the information processing apparatus.

The CPU 11 (processor) loads the V4 printer driver 100, the SNMP (Simple Network Management Protocol) module 200, and the utility program 300, which are stored in the ROM 12 (memory), in the RAM 13, and executes them. The ROM 12 (memory) further stores the Queue Property Bag 400.

The V4 printer driver 100 is a program configured on the basis of so-called V4 (Version 4) printer driver architecture. Windows 8 (registered trademark), which is an OS developed by Microsoft (registered trademark), employs the V4 printer driver architecture. The V4 printer driver 100 includes the printer extension module 110.

The printer extension module 110 is an application configured to generate the first customized UI 116 and display the first customized UI 116 on the display device 17. The first customized UI 116 is a vendor-specific print configuration UI, the vendor being a supplier of the MFP 20. The printer extension module 110 is an execution-file-format (EXE-format) application or the like, for example. The printer extension module 110 functions as the SNMP manager 111 and the first device configuration manager 112 (which will be described later in detail with reference to flowcharts). The printer extension module 110 includes the SNMP-based-communication configuration UI 113, the SNMP frequency configuration UI 114, the SNMP immediate-execution UI 115, and the first customized UI 116 (i.e., displays those UIs on the display device 17).

The SNMP-based-communication configuration UI 113 is a UI that is used to configure SNMP-based-communication information. The SNMP frequency configuration UI 114 is a UI that is used to configure a frequency of executing the SNMP-based communication. The SNMP immediate-execution UI 115 is a UI that is used to immediately execute the SNMP-based communication. The first customized UI 116 is a vendor-specific print configuration UI, the vendor being the supplier of the MFP 20.

The SNMP module 200, which functions as an SNMP manager, obtains device configuration information of the MFP 20, which functions as an SNMP agent, via the network N.

Typically, the utility program 300 is one of Windows (registered trademark) store device applications, and is a program (for example, KYOCERA Print Center) that supports the MFP 20. The utility program 300 displays the second customized UI 302, which is a vendor-specific print configuration UI, the vendor being the supplier of the MFP 20.

The Queue Property Bag 400 is a data storage area specific to the V4 printer driver 100. Each Queue Property Bag 400 supports each MFP 20 (i.e., each printer driver), one-to-one. The Queue Property Bag 400 stores the device configuration information 402 of the MFP 20. Typically, the Queue Property Bag 400 stores invariable and non-dynamic information about the model of the MFP 20.

Note that each of the V4 printer driver 100 and the utility program 300 further includes a rendering unit, a transmitting unit, and the like. The rendering unit generates PDL (Page Description Language) commands, which are print commands that the MFP 20 can interpret. The transmitting unit transmits the PDL commands generated by the rendering unit to the MFP 20. They are not shown in the drawings since they have less relation with the present technique.

3. Operational Flow of Information Processing Apparatus

Figure 3:
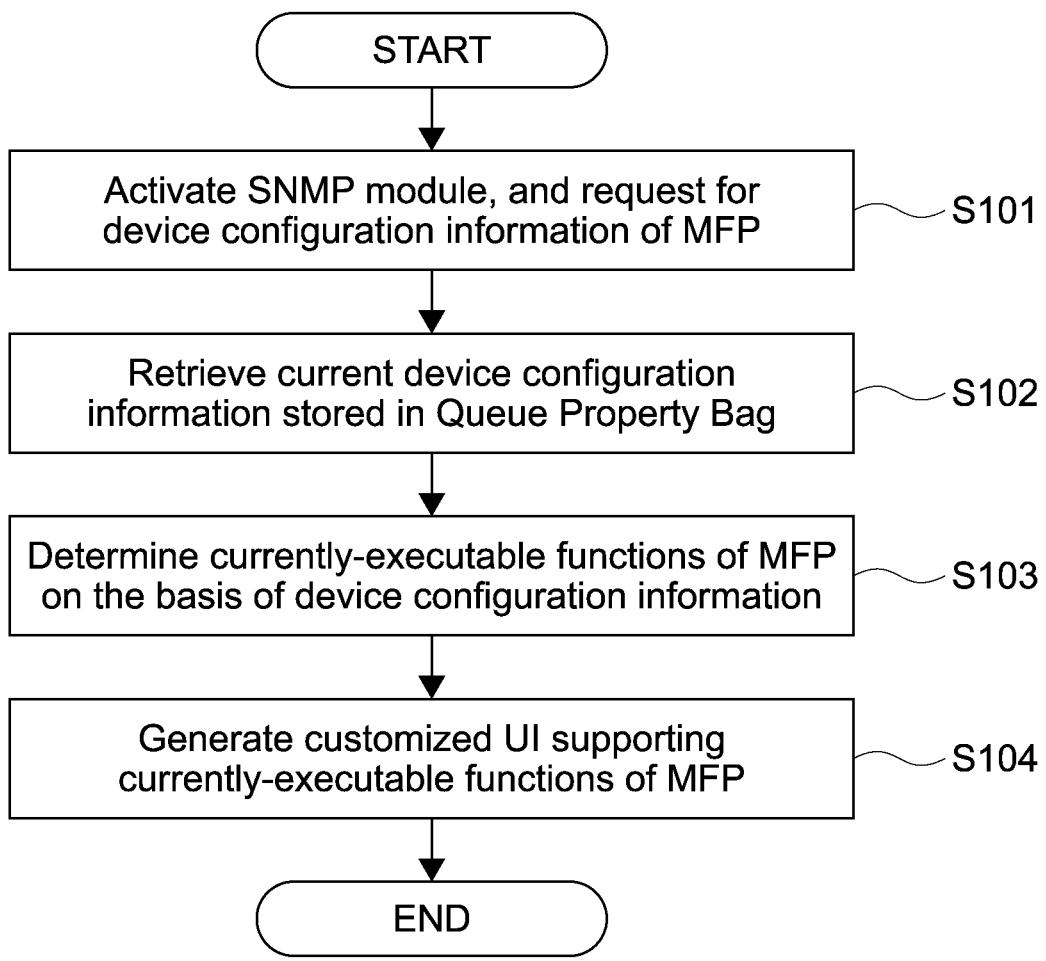
FIG. 3 shows an operational flow of the printer extension module.
Figure 4:
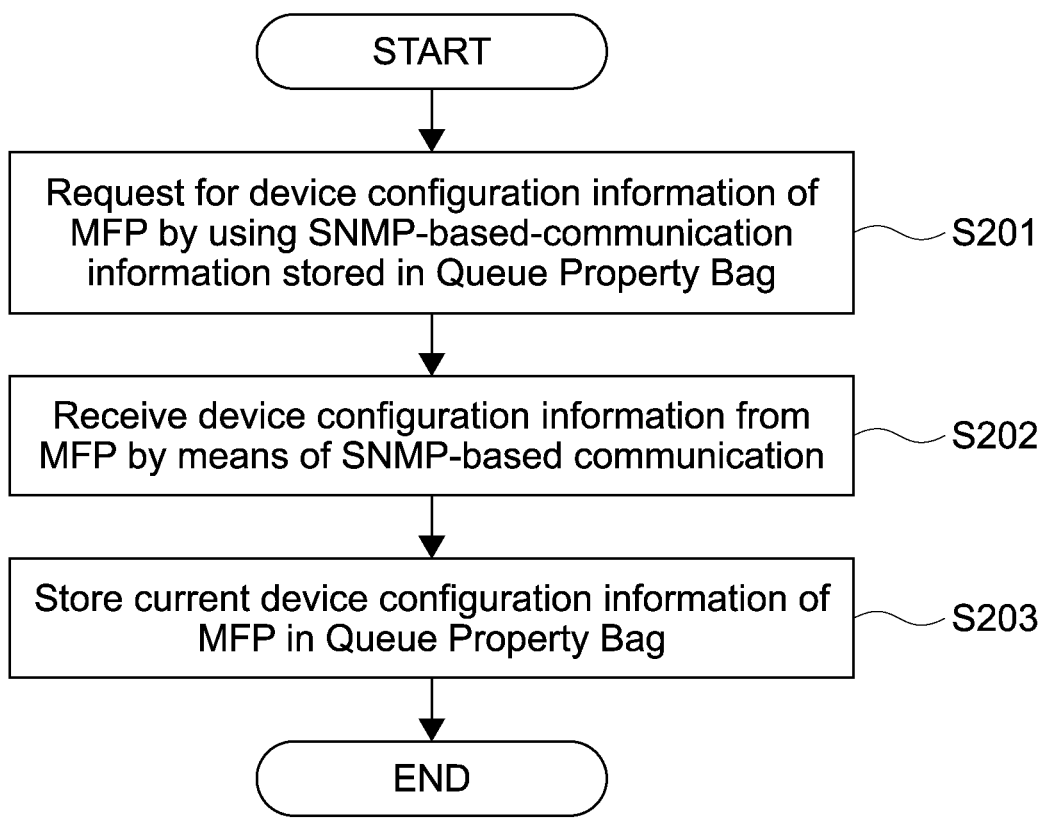
FIG. 4 shows an operational flow of the SNMP module.

FIG. 3 shows an operational flow of the printer extension module. FIG. 4 shows an operational flow of the SNMP module.

Before starting the operational flows, the SNMP manager 111 of the printer extension module 110 detects a predetermined operation input in the SNMP-based-communication configuration UI 113 by a user, and obtains SNMP-based-communication information, which is authentication information necessary for SNMP-based communication. The SNMP manager 111 stores the obtained SNMP-based-communication information 401 in the Queue Property Bag 400. Note that the V3 (Version 3) printer driver, which is of the generation before the V4 printer driver, stores SNMP-based-communication information in Registry. However, the V4 printer driver is incapable of storing SNMP-based-communication information in Registry. Therefore Queue Property Bag is used in the present embodiment.

Before starting the operational flows, the SNMP manager 111 of the printer extension module 110 detects a predetermined operation input in the SNMP frequency configuration UI 114 by a user, and receives a request to configure a frequency (every 10 minutes, every 15 minutes, etc.) of executing the SNMP-based communication. The SNMP manager 111 stores the frequency of executing the SNMP-based communication, i.e., the SNMP-based-communication information 401, in the Queue Property Bag 400.

At the frequency of executing the SNMP-based communication input by using the SNMP frequency configuration UI 114, or upon detecting an input in the SNMP immediate-execution UI 115, the SNMP manager 111 of the printer extension module 110 activates the SNMP module 200. The SNMP manager 111 outputs, to the SNMP module 200, a request to obtain device configuration information of the MFP 20 from the MFP 20 by using the SNMP-based-communication information 401 stored in the Queue Property Bag 400 by means of the SNMP-based communication via the communication interface 15, and to store the obtained device configuration information in the Queue Property Bag 400 (Step S101). The SNMP manager 111 informs the first device configuration manager 112 that the SNMP manager 111 has output the request.

The SNMP module 200 receives the request from the SNMP manager 111 of the printer extension module 110. The SNMP module 200 retrieves the SNMP-based-communication information 401 stored in the Queue Property Bag 400. The SNMP module 200, which functions as the SNMP manager, outputs a request to obtain the device configuration information of the MFP 20 to the MFP 20, which functions as the SNMP agent, by using the retrieved SNMP-based-communication information 401 by means of the SNMP-based communication via the communication interface 15 (Step S201).

The SNMP module 200 receives the device configuration information of the MFP 20 from the MFP 20 by means of the SNMP-based communication via the communication interface 15 (Step S202). The SNMP module 200 stores, in the Queue Property Bag 400, the received device configuration information of the MFP 20 as the current device configuration information 402 (Step S203). The "device configuration information" is information on the hardware and software that the MFP 20 has. Specifically, examples of the hardware and software include cassettes selectable as a paper feeder and a paper catcher and finishers such as a stapler and a puncher.

The first device configuration manager 112 of the printer extension module 110 retrieves the current device configuration information 402, which is received from the MFP 20 and stored in the Queue Property Bag 400 by the SNMP module 200 (Step S102). The first device configuration manager 112 determines the currently-executable functions of the MFP 20 (cassettes selectable as a paper feeder and a paper catcher, and finishers such as a stapler and a puncher) on the basis of the retrieved current device configuration information 402 (Step S103). The first device configuration manager 112 generates the first customized UI 116 of the V4 printer driver 100, the first customized UI 116 supporting the determined functions. The first device configuration manager 112 displays the first customized UI 116 on the display device 17 (Step S104). The newly-generated first customized UI 116 enables the V4 printer driver 100 to select a paper feeder and a paper catcher and to configure finishers such as a stapler and a puncher appropriate for the current device configuration of the MFP 20.

Figure 5:
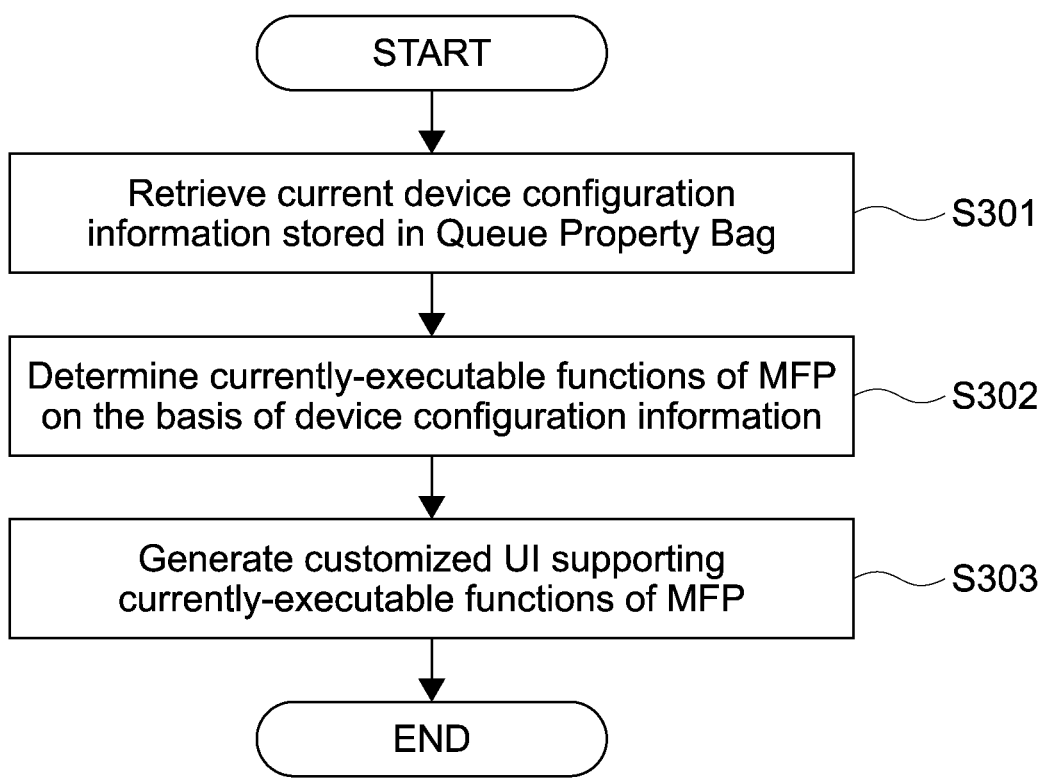
FIG. 5 shows an operational flow of the utility program.

FIG. 5 shows an operational flow of the utility program.

Meanwhile, similar to the first device configuration manager 112, the second device configuration manager 301 of the utility program 300 retrieves the current device configuration information 402, which is received from the MFP 20 and stored in the Queue Property Bag 400 by the SNMP module 200 at a predetermined timing (Step S301). The second device configuration manager 301 determines the currently-executable functions of the MFP 20 (cassettes selectable as a paper feeder and a paper catcher, and finishers such as a stapler and a puncher) supporting the retrieved current device configuration information 402 (Step S302). The second device configuration manager 301 generates the second customized UI 302 of the utility program 300, the second customized UI 302 supporting the determined functions. The second device configuration manager 301 displays the second customized UI 302 on the display device 17 (Step S303). The newly-generated second customized UI 302 enables not only the V4 printer driver 100 but also the utility program 300 to select a paper feeder and a paper catcher and to configure finishers such as a stapler and a puncher appropriate for the current device configuration of the MFP 20.

4. Conclusion

Hardware and software that an MFP has may be changed dynamically. For example, factory-built cassettes selectable as a paper feeder and a paper catcher and factory-built finishers such as a stapler and a puncher may be detached by a user. To the contrary, they may not be factory-built but may be attached by a user. Such factory-built or attached hardware and software may sometimes be in trouble or then restored. When hardware and software of an MFP are changed dynamically, it is desirable to dynamically change selectable functions of a printer driver (e.g., V4 printer driver) or a utility program in order to support variation of hardware and software of the MFP.

According to a conceivable technique, in order to change selectable functions of a printer driver or a utility program of an information processing apparatus, for example, a customized application of the information processing apparatus receives an input (manual input) by a user and changes the functions. However, according to the technique of changing functions by using such a customized application, the current device configuration of the MFP, which is variable, may not be obtained dynamically, and a UI that supports the current device configuration may thus not be displayed.

To the contrary, according to the present embodiment, the SNMP module 200 receives the current device configuration information from the MFP 20 and stores the current device configuration information in the Queue Property Bag 400. The first device configuration manager 112 of the printer extension module 110 of the V4 printer driver 100 retrieves the current device configuration information 402 of the MFP 20 stored in the Queue Property Bag 400. The first device configuration manager 112 generates, on the basis of the retrieved current device configuration information 402 of the MFP 20, the first customized UI 116 of the V4 printer driver 100, the first customized UI 116 supporting the currently-executable functions of the MFP 20. The first device configuration manager 112 displays the first customized UI 116 on the display device 17.

Similarly, the second device configuration manager 301 of the utility program 300 retrieves the current device configuration information 402 of the MFP 20 stored in the Queue Property Bag 400. The second device configuration manager 301 generates, on the basis of the retrieved current device configuration information 402 of the MFP 20, the second customized UI 302 of the utility program 300, the second customized UI 302 supporting the currently-executable functions of the MFP 20. The second device configuration manager 301 displays the second customized UI 302 on the display device 17.

Therefore, according to the present embodiment, it is possible to dynamically and automatically generate and display the customized UI on the basis of the current device configuration information (real configuration) of the MFP 20 without manually inputting customized information.

The information processing apparatus 10 of the present embodiment may be an information processing apparatus for an end user or an information processing apparatus for a manager user. In the latter case, the information processing apparatus 10 may supply the first customized UI 116 and the second customized UI 302 generated dynamically and automatically to client information processing apparatuses for end users.

It should be understood by those skilled in the art that various modifications, combinations, sub-combinations and alterations may occur depending on design requirements and other factors insofar as they are within the scope of the appended claims or the equivalents thereof

What is claimed is:

1. An information processing apparatus, comprising:
    a communication interface configured to execute a SNMP-based communication with an image forming apparatus via a network;
    a memory that stores
        a Queue Property Bag that stores the SNMP-based-communication information, the SNMP-based-communication information being authentication information necessary for the SNMP-based communication,
        an SNMP module configured to execute the SNMP-based communication, and
        a V4 printer driver including a printer extension module; and
    a processor configured to execute the printer extension module and the SNMP module, wherein
    when the processor executes the printer extension module, the processor operates as an SNMP manager configured to
        activate the SNMP module, and
        control the SNMP module to obtain device configuration information of the image forming apparatus from the image forming apparatus by using the SNMP-based-communication information stored in the Queue Property Bag by means of the SNMP-based communication via the communication interface, and to store the obtained device configuration information in the Queue Property Bag, and
    a first device configuration manager configured to
        determine a function that the image forming apparatus is configured to execute on the basis of the device configuration information obtained and stored in the Queue Property Bag by the SNMP module, and
        generate a first customized UI supporting the determined function, the first customized UI being a customized UI of the V4 printer driver.

2. The information processing apparatus according to claim 1, wherein
    the printer extension module includes an SNMP-based-communication configuration UI, the SNMP-based-communication configuration UI being a UI that is used to configure the SNMP-based-communication information, and
    the SNMP manager is configured to store the SNMP-based-communication information input by using the SNMP-based-communication configuration UI in the Queue Property Bag.

3. The information processing apparatus according to claim 1, wherein the printer extension module includes an SNMP frequency configuration UI, the SNMP frequency configuration UI being a UI that is used to configure a frequency of executing the SNMP-based communication, and
the SNMP manager is configured to activate the SNMP module and control the SNMP module to obtain the device configuration information of the image forming apparatus at the frequency of executing the SNMP-based communication input by using the SNMP frequency configuration UI.

4. The information processing apparatus according to claim 1, wherein
the printer extension module includes an SNMP immediate-execution UI, the SNMP immediate-execution UI being a UI that is used to immediately execute the SNMP-based communication, and
the SNMP manager is configured to detect an input in the SNMP immediate-execution UI, and then activate the SNMP module and control the SNMP module to obtain the device configuration information of the image forming apparatus.

5. The information processing apparatus according to claim 1, wherein
the memory further stores a utility program configured to support the image forming apparatus, and
when the processor executes the utility program, the processor operates as
    a second device configuration manager configured to
        determine a function that the image forming apparatus is configured to execute on the basis of the device configuration information obtained and stored in the Queue Property Bag by the SNMP module, and
        generate a second customized UI supporting the determined function, the second customized UI being a customized UI of the utility program.

6. A non-transitory computer readable recording medium, that stores a printer extension module of a V4 printer driver, the printer extension module causing a processor of an information processing apparatus to operate as:
    an SNMP manager configured to
        activate the SNMP module, and
        control an SNMP module to obtain device configuration information of an image forming apparatus from the image forming apparatus by using SNMP-based-communication information stored in Queue Property Bag by means of SNMP-based communication via a communication interface, the SNMP-based-communication information being authentication information necessary for the SNMP-based communication, and to store the obtained device configuration information in the Queue Property Bag; and
    a first device configuration manager configured to
        determine a function that the image forming apparatus is configured to execute on the basis of the device configuration information obtained and stored in the Queue Property Bag by the SNMP module, and
        generate a first customized UI supporting the determined function, the first customized UI being a customized UI of the V4 printer driver.

7. The recording medium according to claim 6, wherein
the printer extension module includes an SNMP-based-communication configuration UI, the SNMP-based-communication configuration UI being a UI that is used to configure the SNMP-based-communication information, and the SNMP manager is configured to store the SNMP-based-communication information input by using the SNMP-based-communication configuration UI in the Queue Property Bag.

8. The recording medium according to claim 6, wherein the printer extension module includes an SNMP frequency configuration UI, the SNMP frequency configuration UI being a UI that is used to configure a frequency of executing the SNMP-based communication, and the SNMP manager is configured to activate the SNMP module and control the SNMP module to obtain the device configuration information of the image forming apparatus at the frequency of executing the SNMP-based communication input by using the SNMP frequency configuration UI.

9. The recording medium according to claim 6, wherein the printer extension module includes an SNMP immediate-execution UI, the SNMP immediate-execution UI being a UI that is used to immediately execute the SNMP-based communication, and the SNMP manager is configured to detect an input in the SNMP immediate-execution UI, and then activate the SNMP module and control the SNMP module to obtain the device configuration information of the image forming apparatus.

10. An information processing method, comprising:

activating the SNMP module, and controlling an SNMP module to obtain device configuration information of an image forming apparatus from the image forming apparatus by using a SNMP-based-communication information stored in a Queue Property Bag by means of a SNMP-based communication via a communication interface, the SNMP-based-communication information being authentication information necessary for the SNMP-based communication, and to store the obtained device configuration information in the Queue Property Bag; and determining a function that the image forming apparatus is configured to execute on the basis of the device configuration information obtained and stored in the Queue Property Bag by the SNMP module, and generating a first customized UI supporting the determined function, the first customized UI being a customized UI of a V4 printer driver.

11. The information processing method according to claim 10, further comprising:

storing the SNMP-based-communication information input by using an SNMP-based-communication configuration UI in the Queue Property Bag, the SNMP-based-communication configuration UI being a UI that is used to configure the SNMP-based-communication information.

12. The information processing method according to claim 10, further comprising:

activating the SNMP module and controlling the SNMP module to obtain the device configuration information of the image forming apparatus at the frequency of executing the SNMP-based communication input by using an SNMP frequency configuration UI, the SNMP frequency configuration UI being a UI that is used to configure a frequency of executing the SNMP-based communication.

13. The information processing method according to claim 10, further comprising:

detecting an input in an SNMP immediate-execution UI, and then activating the SNMP module and controlling the SNMP module to obtain the device configuration information of the image forming apparatus, the SNMP immediate-execution UI being a UI that is used to immediately execute the SNMP-based communication.

14. The information processing method according to claim 10, further comprising:

determining a function that the image forming apparatus is configured to execute on the basis of the device configuration information obtained and stored in the Queue Property Bag by the SNMP module; and generating a second customized UI supporting the determined function, the second customized UI being a customized UI of a utility program configured to support the image forming apparatus.

* * * * *